US009825812B2

(12) United States Patent
Conner et al.

(10) Patent No.: US 9,825,812 B2
(45) Date of Patent: Nov. 21, 2017

(54) TRANSPARENTLY INTERCEPTING AND OPTIMIZING RESOURCE REQUESTS

(71) Applicant: Pulse Secure, LLC, San Jose, CA (US)

(72) Inventors: Glenn C. Conner, San Francisco, CA (US); Jeffrey M. Harris, San Francisco, CA (US)

(73) Assignee: Pulse Secure, LLC, San Jose, CA (US)

( * ) Notice: Subject to any disclaimer, the term of this patent is extended or adjusted under 35 U.S.C. 154(b) by 207 days.

(21) Appl. No.: 14/327,187

(22) Filed: Jul. 9, 2014

(65) Prior Publication Data

US 2015/0163087 A1    Jun. 11, 2015

Related U.S. Application Data

(60) Provisional application No. 61/912,271, filed on Dec. 5, 2013.

(51) Int. Cl.
*H04L 12/24*    (2006.01)
*H04L 29/08*    (2006.01)
(Continued)

(52) U.S. Cl.
CPC .......... *H04L 41/0823* (2013.01); *H04L 67/06* (2013.01); *H04L 67/10* (2013.01);
(Continued)

(58) Field of Classification Search
None
See application file for complete search history.

(56) References Cited

U.S. PATENT DOCUMENTS

| 7,072,984 B1 * | 7/2006 | Polonsky .......... G06F 17/30905 707/E17.121 |
| 8,516,158 B1 * | 8/2013 | Wu ..................... H04L 67/2847 709/223 |

(Continued)

OTHER PUBLICATIONS

Housel BC, Samaras G, Lindquist DB. WebExpress: A client/intercept based system for optimizing web browsing in a wireless environment. Mobile Networks and Applications. Dec. 30, 1998;3(4):419-31.*

*Primary Examiner* — Ranodhi Serrao
*Assistant Examiner* — James Fiorillo
(74) *Attorney, Agent, or Firm* — Park, Vaughan, Fleming & Dowler LLP; Laxman Sahasrabuddhe

(57) ABSTRACT

Systems and techniques for transparently intercepting and optimizing resource requests are described. Some embodiments can send a request to a server. In response to the request, the embodiments can receive a first script and at least a second script from the server, wherein the first script includes instructions for intercepting invocations to a set of functions, and wherein the second script includes at least one invocation to at least one function in the set of functions. The first script can then be executed, thereby causing subsequent invocations to each function in the set of functions to be intercepted by a corresponding resource optimization handler. Next, the second script can be executed. When the executing second script invokes a function in the set of functions, the invocation of the function can be intercepted, and a resource optimization handler corresponding to the function can be invoked instead of invoking the function.

13 Claims, 3 Drawing Sheets

(51) Int. Cl.
*G06F 17/30* (2006.01)
*G06F 17/22* (2006.01)

(52) U.S. Cl.
CPC .......... *H04L 67/34* (2013.01); *G06F 17/2247* (2013.01); *G06F 17/30899* (2013.01); *G06F 17/30902* (2013.01)

(56) References Cited

U.S. PATENT DOCUMENTS

| | | | |
|---|---|---|---|
| 8,595,752 B1 | 11/2013 | Fioravanti et al. | |
| 8,984,048 B1* | 3/2015 | Maniscalco | G06F 17/30902 709/201 |
| 2001/0047394 A1* | 11/2001 | Kloba | G06F 17/30899 709/217 |
| 2007/0061486 A1* | 3/2007 | Trinh | G06F 17/30905 709/246 |
| 2008/0229025 A1* | 9/2008 | Plamondon | G06F 12/0862 711/126 |
| 2008/0235383 A1 | 9/2008 | Schneider | |
| 2009/0183171 A1 | 7/2009 | Isaacs et al. | |
| 2011/0202589 A1* | 8/2011 | Piernot | G06F 9/546 709/202 |
| 2012/0137210 A1* | 5/2012 | Dillon | G06F 17/30902 715/234 |
| 2012/0222117 A1 | 8/2012 | Wong et al. | |
| 2012/0324376 A1* | 12/2012 | Hong | G06F 9/4443 715/762 |
| 2013/0066848 A1* | 3/2013 | Tuttle | G06F 17/3089 707/711 |
| 2013/0132599 A1* | 5/2013 | Nakashima | H04L 67/34 709/230 |
| 2013/0173782 A1* | 7/2013 | Ragutski | H04L 63/123 709/224 |
| 2014/0149844 A1* | 5/2014 | Podjarny | G06F 17/2247 715/234 |
| 2014/0156825 A1* | 6/2014 | Milner | G06F 17/30899 709/223 |
| 2015/0067819 A1* | 3/2015 | Shribman | H04L 67/06 726/12 |
| 2015/0088969 A1* | 3/2015 | Wei | H04L 67/10 709/203 |

* cited by examiner

TRANSPARENTLY INTERCEPTING AND OPTIMIZING RESOURCE REQUESTS

RELATED APPLICATION

This application claims benefit of U.S. Provisional Patent Application No. 61/912,271, by the same inventors, filed on 5 Dec. 2013, the contents of which are herein incorporated by reference in their entirety for all purposes.

BACKGROUND

The present disclosure relates to data networking in general and to optimizing network traffic in particular.

Data communications networks, such as local area networks (LANs) and wide area networks (WANs) often include a variety of network devices for sending, receiving, directing, and optimizing network data traffic. A WAN optimization device is a type of network device that can improve network performance in reading and/or writing data over a WAN. WAN optimization devices often operate in pairs on both sides of a WAN to de-duplicate, compress, prefetch, cache, and otherwise optimize network traffic. For example, a WAN optimization device may intercept network traffic from a server before it reaches the WAN; compress this network traffic; and communicate this compressed network traffic over the WAN to a second WAN optimization application or device near or within a client device. The second WAN optimization application or device then decompresses or otherwise processes the compressed network traffic to reconstruct the original network traffic and forward it, if necessary, to the destination client device.

WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices and applications and "WAN optimization" is used to refer to such techniques.

Application development is shifting to a new approach that leverages recent advances in web-based technologies and mobile devices. There is an unmet need to optimize network traffic for applications that are developed using this new approach.

SUMMARY

Some embodiments described herein provide systems and techniques for transparently intercepting and optimizing resource requests. In some embodiments, a software application (e.g., a web browser) that is executing on a computer can send a request to a server, wherein the software application can include a set of functions for obtaining and presenting information, and wherein the set of functions can be invoked by scripts that are retrieved and executed by the software application (for example, the set of functions can be a document object model (DOM) implementation, and the script can be a JavaScript script).

Next, in response to the request, the software application can receive a first script (e.g., script "S1") and at least a second script (e.g., script "S2") from the server, wherein the first script can include instructions for intercepting invocations to the set of functions, and wherein the second script can include at least one invocation to at least one function in the set of functions.

The software application can then execute the first script, thereby causing subsequent invocations to each function in the set of functions to be intercepted by a corresponding resource optimization handler. Next, the software application can execute the second script. Now, when the executing second script invokes a function in the set of functions, the invocation of the function can be intercepted, and a resource optimization handler corresponding to the function can be invoked (i.e., instead of the function being invoked).

In some embodiments, the second script may have invoked the function to retrieve a resource from a remote location. In these embodiments, if the resource is available in a local cache, the invoked resource optimization handler can retrieve the resource from the local cache instead of retrieving the resource from the remote location. In some embodiments, prior to the second script invoking the function, the resource may have been pre-fetched and stored in the local cache (e.g., by another resource optimization handler that was invoked earlier). On the other hand, if the resource is not available in a local cache, the invoked resource optimization handler can retrieve the resource from the remote location. Alternatively, the invoked resource optimization handler can invoke the function (i.e., the function whose invocation was intercepted), which, in turn, can retrieve the resource from the remote location.

In some embodiments, if an optimized version of the resource is available, the invoked resource optimization handler can retrieve the optimized version of the resource, generate a non-optimized version of the resource from the optimized version of the resource, and return the non-optimized version of the resource to the script. For example, the optimized version of the resource can be a de-duplicated version of the resource, and the invoked resource optimization handler can generate the non-optimized version of the resource by reconstructing the resource from the de-duplicated version of the resource. As another example, the optimized resource can be a compressed version of the resource, and the invoked resource optimization handler can generate the non-optimized version of the resource by decompressing the optimized resource.

In some embodiments, the resource optimization handler can determine that the optimized version of the resource is available by performing a lookup on a table using an identifier associated with the resource, wherein the table maps identifiers associated with resources to identifiers associated with optimized resources. For example, each identifier associated with a resource or an optimized resource can be a Uniform Resource Locator (URL). If the table lookup succeeds, the invoked resource optimization handler can determine that the optimized version of the resource is available. On the other hand, if the table lookup fails, the invoked resource optimization handler can determine that the optimized version of the resource is not available.

DETAILED DESCRIPTION

Figure 1:
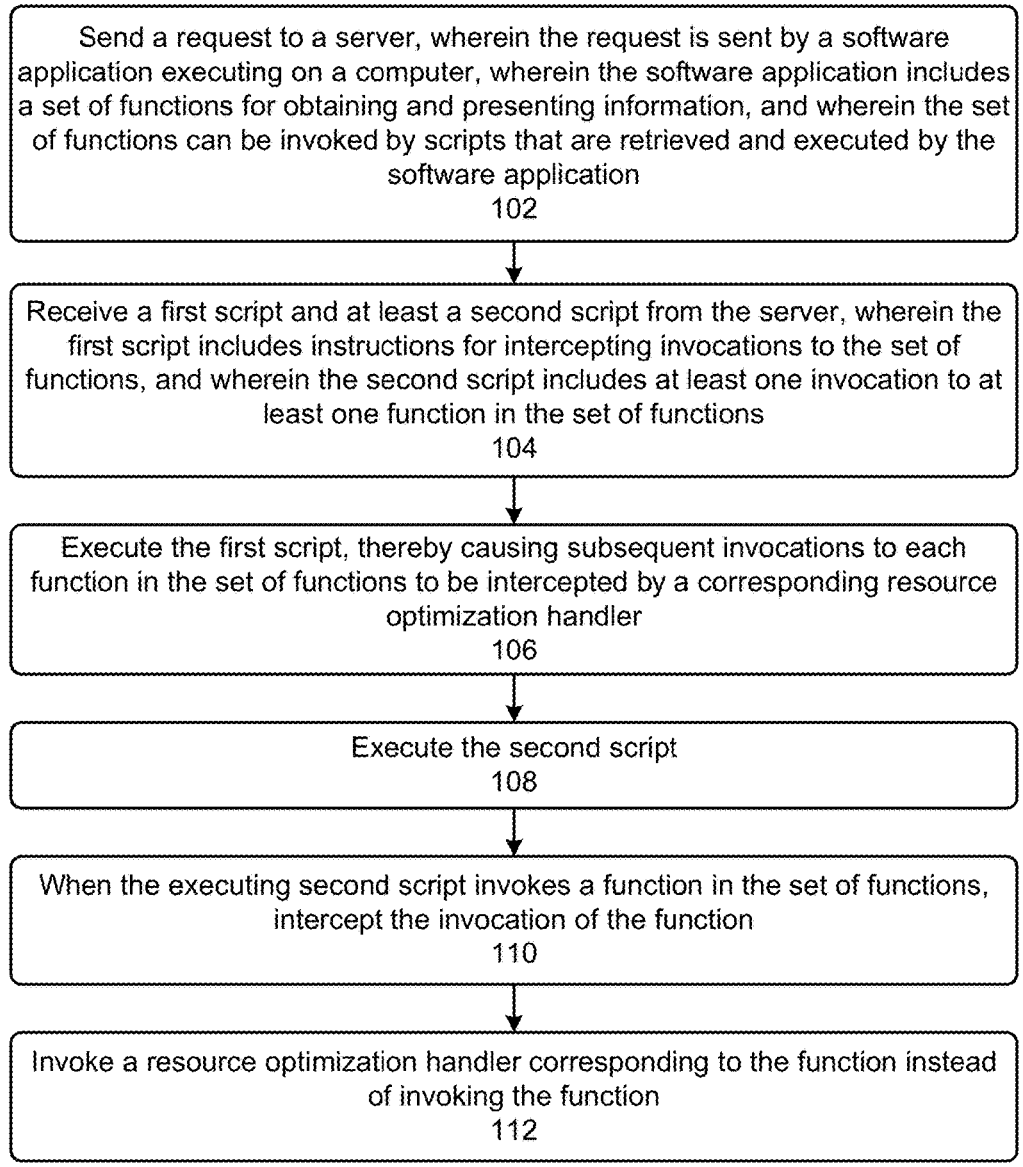
FIG. 1 illustrates a process for transparently intercepting and optimizing resource requests in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism (e.g., processing circuitry) that is capable of executing instructions stored on a storage medium (e.g., random access memory). Examples of computers include, but are not limited to, handheld computers, laptop computers, desktop computers, distributed computers, printers, appliances, and other apparatuses that include hardware (and optionally software) for performing computations.

According to one definition, a network is an interconnection of one or more devices that is capable of delivering information from one computer to another computer. Examples of networks include, but are not limited to, wireless and wired networks, LANs, MANs, WANs, private networks, public networks, intranets, internets, etc.

According to one definition, a software application is a set of instructions that can be executed by one or more processors. A software application can include instructions stored in one or more files, and when executed, a software application can correspond to one or more processes and/or threads.

Optimizing Resource Requests

One problem in optimizing a web page (or generally any other document that includes one or more resources) is how to improve the composition and loading patterns of resources on the page while preserving the original functional behavior of the page. Some web content optimization (WCO) solutions usually do this by analyzing a page and identifying the script/link/img tags present in the HyperText Markup Language (HTML) before doing some transformation on those tags. However many modern JavaScript frameworks now contain mechanisms to dynamically load additional resources after the page has been loaded in the browser, or in response to the users interactions with the page. Because the invocation of these additional resources is done via client side JavaScript, server side WCO processing of the page is unable to identify any of these additional references, and therefore is unable to perform any analysis or optimization on resources loaded in this way.

In addition, some WCO techniques change the URL of resources injected into the page, either as a result of creating virtual optimized resources, or appending some sort of content hash for the purpose of applying client size caching headers. This poses a problem for some scripts that perform string manipulation of the URLs on the page because these scripts assume that the URLs will be present in their original form. An example of a script that performs string manipulation of the URL is an image carousel that cycles through a set of images by appending an incrementing integer to the end of the URL. If the original URL was altered on the server as a result of WCO optimization, the image carousel script's logic would then process the optimized URL incorrectly and try to load images which most likely don't exist.

In summary, two serious problems for optimizing web pages can be articulated as follows. First, how can we improve the performance of webpages using WCO techniques on pages that load much of their content dynamically via JavaScript loader frameworks? Second, how can we improve WCO compatibility with scripts that manipulate the URL of optimized resources?

Some embodiments described herein provide systems and techniques that solve resource optimization problems, such as the above-described web content optimization problems which have remained unsolved for many years. Specifically, some embodiments transparently intercept requests for resources made via JavaScript on a web page for the purpose of optimizing the underlying network traffic without altering the original scripts or page behavior. Some systems and techniques for optimizing resource requests are now described.

Transparently Intercepting and Optimizing Resource Requests

FIG. 1 illustrates a process for transparently intercepting and optimizing resource requests in accordance with some embodiments described herein. The process can begin by sending a request to a server, wherein the request is sent by a software application executing on a computer, wherein the software application includes a set of functions for obtaining and presenting information, and wherein the set of functions can be invoked by scripts that are retrieved and executed by the software application (operation 102). For example, the software application can be a web browser, and the set of functions can implement a document object model (DOM) for interacting and representing objects in documents, such as HTML, Extensible HyperText Markup Language (XHTML), and Extensible Markup Language (XML) documents.

Next, in response to the request, the software application can receive a first script and at least a second script from the server, wherein the first script includes instructions for intercepting invocations to the set of functions, and wherein the second script includes at least one invocation to at least one function in the set of functions (operation 104).

The first script can then be executed, thereby causing subsequent invocations to each function in the set of functions to be intercepted by a corresponding resource optimization handler (operation 106). Next, the second script can be executed (operation 108). When the executing second script invokes a function in the set of functions, the invocation of the function can be intercepted (operation 110), and a resource optimization handler corresponding to the function can be invoked instead of invoking the function (operation 112).

In some embodiments, the second script may have invoked the function to retrieve a resource from a remote location. The invoked resource optimization handler can determine whether or not the resource is available in a local cache. If the resource is available in the local cache, the invoked resource optimization handler can retrieve the resource from the local cache instead of retrieving the resource from the remote location. On the other hand, if the resource is not available in a local cache, the invoked resource optimization handler can retrieve the resource from the remote location. Alternatively, if the resource is not available in a local cache, the invoked resource optimization handler can invoke the function, which, in turn, can retrieve the resource from the remote location.

In some embodiments, the optimized resource handler can determine whether or not an optimized version of the resource is available. For example, in some embodiments, the invoked resource optimization handler can determine whether or not an optimized version of the resource is available by performing a lookup on a table using an identifier associated with the resource, wherein the table maps identifiers associated with resources to identifiers associated with optimized resources. If the table lookup succeeds, the invoked resource optimization handler can determine that the optimized version of the resource is available. On the other hand, if the table lookup fails, the invoked resource optimization handler can determine that the optimized version of the resource is not available. In some embodiments, each identifier associated with a resource or an optimized resource can be a URL.

If the invoked resource optimization handler determines that an optimized version of the resource is available, then the invoked resource optimization handler can retrieve the optimized version of the resource, generate a non-optimized version of the resource from the optimized version of the resource, and return the non-optimized version of the resource to the script.

For example, in some embodiments, the optimized version of the resource can be a de-duplicated version of the resource, and the invoked resource optimization handler can generate the non-optimized version of the resource by reconstructing the resource from the de-duplicated version of the resource. As another example, the optimized version of the resource can be a compressed version of the resource (e.g., a version that is generated using a compression technique such as LZW), and the invoked resource optimization handler can generate the non-optimized version of the resource by decompressing the compressed version of the resource. Some techniques for de-duplication and compression are described in U.S. Pat. No. 6,667,700 entitled "Content-Based Segmentation Scheme for Data Compression in Storage and Transmission Including Hierarchical Segment Representation," which is herein incorporated by reference in its entirety for all purposes. In yet another example, the optimized version of the resource can be a concatenated version that is obtained by concatenating multiple resources into a single concatenated version, and the invoked resource optimization handler can retrieve the concatenated version via a single network request, and then extract the required resource(s) or extract all of the multiple resources by de-concatenating the concatenated version (e.g., by splitting the concatenated version into its constituent parts).

These examples have been presented for illustration purposes only and are not intended to limit the scope of the embodiments to the forms disclosed. For example, in some embodiments, multiple optimization techniques can be used together to create the optimized version—e.g., multiple resources can be concatenated to obtain a single concatenated version, and then the single concatenated version can be de-duplicated or compressed to obtain the optimized version.

In some embodiments, prior to the second script invoking the function, the resource can be pre-fetched and stored by another resource optimization handler in the local cache (e.g., a resource optimization handler that was invoked earlier). For example, if it is observed that a set of resources are usually requested together, then whenever one of the resources in the set of resources is requested, the resource optimization handler can pre-fetch the other resources in the set of resources with the expectation that the other resources will soon be requested. Some techniques for pre-fetching content are described in U.S. Patent Pub. No. 2010/0241654 entitled "Virtualized data storage system optimizations," which is herein incorporated by reference in its entirety for all purposes.

Consider the following example scenario. Suppose, the second script invokes a first function, e.g., function F1, to retrieve a first resource, e.g., resource R1. Instead of invoking function F1, a corresponding resource optimization handler, e.g., H1, may be invoked (recall that the first script, which was executed before the second script, included instructions for intercepting invocations to the set of functions).

Let us assume that the resource optimization handler H1 includes instructions that implement pre-fetching logic, and let us suppose that the resource optimization handler H1 uses the pre-fetching logic to determine that the second script is likely to retrieve another resource, e.g., R2. Accordingly, the resource handler H1 may pre-fetch resource R2 and store it in the local cache. Subsequently, the second script may invoke a second function, e.g., function F2, to retrieve a second resource, e.g., resource R2. Instead of invoking function F2, a corresponding resource optimization handler, e.g., H2, may be invoked. However, note that resource R2 has already been pre-fetched and stored in the local cache. Therefore, resource optimization handler H2 may determine that resource R2 is already in the local cache (because it was pre-fetched by another resource optimization handler H1), and return the resource R2 to the second script by retrieving resource R2 from the local cache instead of retrieving resource R2 from a remote location.

Figure 2:
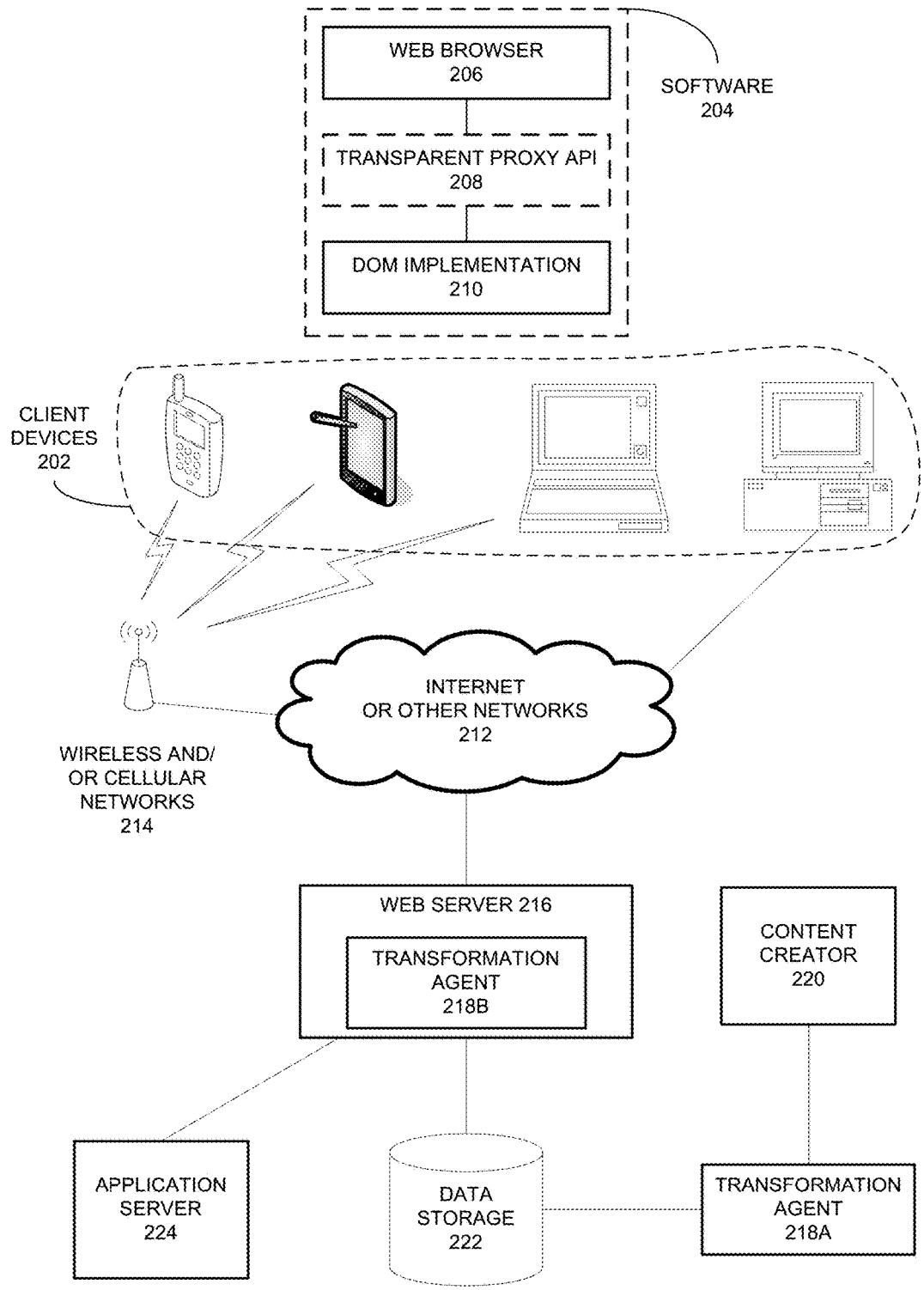
FIG. 2 illustrates an example of how resource requests can be transparently intercepted and optimized in accordance with some embodiments described herein.

FIG. 2 illustrates an example of how resource requests can be transparently intercepted and optimized in accordance with some embodiments described herein. Client devices 202 can include portable and desktop personal computers, tablet computers, and/or smartphones or other mobile electronic devices. In general, the system illustrated in FIG. 2 can interface with any type of electronic device, such as a thin-client computer, Internet-enabled mobile telephone, mobile Internet access device, electronic book, or personal digital assistant, capable of displaying and navigating web pages or other types of electronic documents. Although system is shown with four client systems, any number of client systems can be supported.

Web server 216 can be used to process requests from web browsers and standalone applications for web pages, electronic documents and other data from the user computers. Web server 216 may also provide syndicated content, such as RSS or Atom feeds.

One or more application servers 224 can operate one or more data applications that can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails or .NET.

The data applications on application server 224 and the web server 216 can store or retrieve data from data storage 222. Data storage 222 may include one or more file servers and/or databases, such as a relational database.

In an embodiment, the web server 216, application server 224, and/or data storage 222 may be implemented as virtual machines and/or applications operating on one or more general purpose computers. Web server 216, application server 224, and data storage 222 can be connected via a local and/or public or private wide-area network. Web server 216, application server 224, and/or data storage 222 can also be connected with the internet or other local- and wide-area networks 212 and/or wireless and/or cellular data networks 214.

Client devices 202 can execute software 204. Software 204 can generally include any set of instructions that can be executed by one or more processors. For example, software 204 can include web browser 206 and a DOM implementation 210. In some embodiments, DOM implementation 210 can expose an application programmer interface (API), and a script executed by web browser 206 can interact and represent objects in documents by invoking appropriate functions using the API for DOM implementation 210.

Some embodiments can include a transformation agent that transforms content at the server side of a WAN. The content transformation agent may be located in many alternate locations within the system illustrated in FIG. 2. For example, a content transformation agent 218A may be used by a content creator 220 to process and create transformed content (e.g., the transformed content may include a script that, when executed by a web browser, causes invocations to a set of functions to be transparently intercepted and handled by resource optimization handlers). In this example, the transformed content is then stored by the data storage 222 and communicated with client devices 202 by the web server 216.

In another example, a content transformation agent 218B is located within a web server 216. In response to a web page request from one of the client devices 202, the web server 216 can retrieve the web page from data storage 222 and/or dynamically generate the web page alone or in conjunction with application server 224. Once the web server 216 retrieves and/or generates the web page to be returned to the requesting client device, the content transformation agent 218B can then transform the web page, e.g., by adding a script that, when executed by a web browser, causes invocations to a set of functions to be transparently intercepted and handled by resource optimization handlers. The transformed web page can then be sent to the requesting client device 202.

In yet another example, a content transformation agent (not shown in FIG. 2) may be located within a proxy device (also not shown in FIG. 2) or any other application or device between the web server 216 and the client devices 202. Examples of proxy devices include web optimization devices, load balancing devices, network monitoring devices, and firewall and security devices. In still another example of a proxy device, the content transformation agent may be a standalone device or application.

As mentioned above, the transformation agent can add a script to a web page. When the web page is requested by a web browser, the web server can send the web page (which now includes the script in addition to any other data that already existed in the web page) to the web browser. Next, the web browser can execute the script, thereby causing subsequent invocations to a set of functions to be transparently intercepted, and handled by resource optimization handlers. The resource optimization handler can then optimize resource accesses by the web browser. For example, when web browser 206 executes the script, the script may interpose transparent proxy API 208 between web browser 206 and DOM implementation 210. Transparent proxy API 208 can intercept some or all invocations that a script executed by web browser 206 makes to functions in DOM implementation 210. Once transparent proxy API 208 intercepts an invocation of a function, transparent proxy API 208 can then invoke a corresponding resource optimization handler to optimize the resource request.

Some embodiments described herein optimize resource requests by a web browser. According to one definition, a script loader framework generally refers to a mechanism that enables scripts to be loaded and executed. For example, in some embodiments, the script loader framework can be implemented as a script which, when executed by a web browser (e.g., web browser 206), enables other scripts to access remote resources instead of those other scripts having to use the web browser's API directly.

Despite the huge variety in how script loader frameworks are implemented, they almost always use a common mechanism provided as part of the web browsers API to insert dynamic resources into a page. Specifically, many implementations use the web browser's DOM API that includes a mechanism to specify the URL for a resource in case the browser needs to retrieve that resource. For example, in some embodiments, dynamic resources are inserted by first creating the relevant DOM element, be it an image, link or script, setting the "src" property of the element to the desired URL (and possibly a JavaScript onload or onerror callback function), then inserting the element into the page DOM. In addition to the "src" property, some elements may use different property names such as "href." However, the effect is the same, and those additional properties can be intercepted in the same way "src" property can be intercepted.

So, regardless of how the rest of the script framework is built, some embodiments described herein can gain control over a script loader's ability to generate HTTP requests to the backend server by intercepting this mechanism, and once the embodiments gain control over the ability to send HTTP requests, the embodiments can then apply whatever optimizations are desired to be applied to the actual network traffic, and at the same time ensure that the resulting data is presented back to the script loader in the same order, and that the same event callbacks are fired that the script expects.

As explained above, many embodiments insert dynamic elements in a page via the src/href property. However, some embodiments may use an alternative approach that involves generating an XMLHttpRequest and fetching content from a specified URL. In this case also we can intercept these requests by creating a proxy object (e.g., a resource optimization handler) for the browsers native XMLHttpRequest object, and then instead of the browser retrieving the resource from the specified URL, the resource optimization handler can be invoked. Next, the resource optimization handler can check if an optimized version of the resource is available. If so, the resource optimization handler can retrieve the optimized version, generate the non-optimized version, and provide the non-optimized version to the browser. Otherwise, if an optimized version is not available, the resource optimization handler can obtain the resource via a network request for the original URL.

Some embodiments create a transparent proxy API over the JavaScript DOM which we can then use to intercept resource load events and proxy them to the optimized resource handler instead. Specifically, some embodiments can perform the following operations: (1) hook all of the web browser's DOM functions which are commonly used to create page elements at run time (e.g., document.createElement) or to retrieve an existing page elements (e.g., document.getElementById); (2) create a wrapper object with the same external interface as a normal page element created by each function (e.g., document.createElement), but that includes some extra functionality (which is explained below); (3) use the hooked DOM functions to return instances of this wrapper object whenever the client script invokes the normal DOM functions; (4) override all DOM function prototypes that relate to inserting/adding/removing elements from the page, thereby ensuring that if a script tries to add one of the wrapper objects, the actual inner element can be pulled out and added that to the page; and (5) when a script tries to SET the "src" property on one of the wrapper objects, perform the following operations: (i) instead of setting the "src" property on the inner element, look up a mapping table that maps URLs to optimized-URLs and check if there is an entry present, (ii) if a script tries to GET the "src" property from one of the wrapper objects, and if the actual property represents an optimized URL, then return the original element's URL rather than the optimized version to the script, (iii) if there is no entry present, set the "src" property as normal and let the browser manage the loading, and finally (iv) if there is an entry present, then create an XmlHttpRequest (XHR) to the optimized URL, and after receiving the data, pick out the relevant part of the optimized content and inject it into the inner element before firing the elements onload callback.

Embodiments described in this disclosure have a number of advantages over conventional WCO solutions. Specifically, embodiments described herein can work with all script loader frameworks without having to make any changes to the script loader frameworks themselves. This makes the embodiments described herein a very generic solution, with no maintenance required to keep compatibility with new framework releases etc. Additionally, the script execution order can be maintained exactly, thereby obviating any compatibility issues. Moreover, embodiments disclosed herein allow complete control over the network traffic for optimized resources, allowing multiple methods of optimizing the network traffic including combining requests and parallel preloading of those combined requests. Because some embodiments can use XMLHttpRequest (XHR) to proxy the real requests, the embodiments can also leverage the browsers existing caching functionality. Furthermore, embodiments described herein can allow URLs to be altered on the server side, without affecting scripts that do string processing on those URLs on the client side. Finally, embodiments described herein have a very graceful fallback in the event of problems—e.g., if a request for an optimized script resource fails to load, the embodiments can just SET the "src" property as the script loader originally intended, thereby preserving the functionality of the web page.

Figure 3:
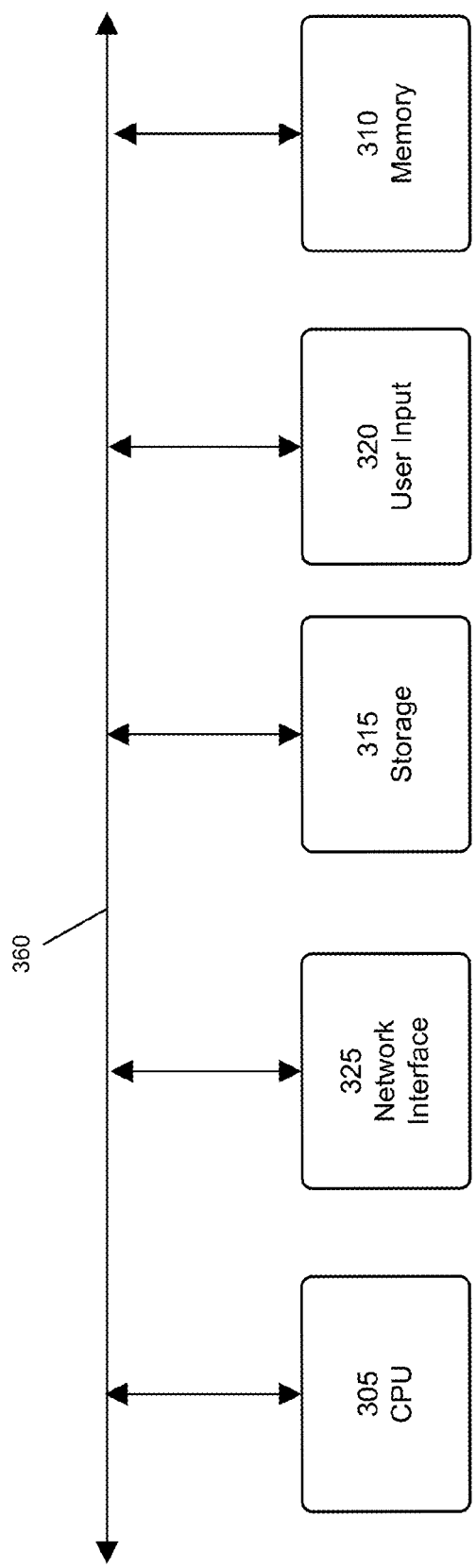
FIG. 3 illustrates an example of a computer system that can be used in conjunction with embodiments described herein.

FIG. 3 illustrates an example of a computer system that can be used in conjunction with embodiments described herein. FIG. 3 is a block diagram of a computer system 300, such as a personal computer or other digital device, suitable for practicing some embodiments described herein. Embodiments of computer system 300 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 300 includes a central processing unit (CPU) 305 for running software applications and optionally an operating system. CPU 305 may be comprised of one or more processing cores. Memory 310 stores applications and data for use by the CPU 305. Examples of memory 310 include dynamic and static random access memory. Storage 315 provides non-volatile storage for applications and data and may include fixed or removable hard disk drives, flash memory devices, ROM memory, and CD-ROM, DVD-ROM, Blu-ray, or other magnetic, optical, or solid state storage devices.

In a further embodiment, CPU 305 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 305 or associated processing cores can include virtualization specific hardware, such as additional register sets, memory address manipulation hardware, additional virtualization-specific processor instructions, and virtual machine state maintenance and migration hardware.

Optional user input devices 320 communicate user inputs from one or more users to the computer system 300, examples of which may include keyboards, mice, joysticks, digitizer tablets, touch pads, touch screens, still or video cameras, and/or microphones. In an embodiment, user input devices may be omitted and computer system 300 may present a user interface to a user over a network, for example using a web page or network management protocol and network management software applications.

Computer system 300 includes one or more network interfaces 325 that allow computer system 300 to communicate with other computer systems via an electronic communications network, and may include wired or wireless communication over local area networks and wide area networks such as the Internet. Computer system 300 may support a variety of networking protocols at one or more levels of abstraction. For example, computer system may support networking protocols at one or more layers of the seven layer OSI network model. An embodiment of network interface 325 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 300 may also include one or more wired networking interfaces, such as one or more Ethernet connections to communicate with other networking devices via local or wide-area networks.

The components of computer system 300, including CPU 305, memory 310, data storage 315, user input devices 320, and network interface 325 are connected via one or more data buses 360. Additionally, some or all of the components of computer system 300, including CPU 305, memory 310, data storage 315, user input devices 320, and network interface 325 may be integrated together into one or more integrated circuits or integrated circuit packages. Furthermore, some or all of the components of computer system 300 may be implemented as application specific integrated circuits (ASICs) and/or programmable logic.

Further embodiments can be envisioned to one of ordinary skill in the art. Combinations or sub-combinations of the subject matter disclosed herein can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, ASICs, field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
sending a request to a server, wherein the request is sent by software code executing on a computer, wherein the software code includes a browser and a set of functions for obtaining and presenting information, and wherein the set of functions can be invoked by scripts that are retrieved by the browser;
in response to the request, receiving a first script and at least a second script from the server, wherein the first script includes instructions for adding a proxy software layer to intercept invocations to the set of functions, wherein the second script includes at least one invocation to at least one function in the set of functions, and wherein the first script and at least the second script are received by the browser;
executing the first script on the computer, thereby adding the proxy software layer to intercept subsequent invocations to each function in the set of functions;
executing the second script on the computer;
when the executing second script invokes a function in the set of functions,
the proxy software layer intercepting said invocation of the function, and
the proxy software layer invoking a resource optimization handler corresponding to the function instead of invoking the function, wherein the second script invoked the function to retrieve a resource from a remote location;
wherein in response to determining that an optimized version of the resource is available, the invoked resource optimization handler retrieves the optimized version of the resource, generates a non-optimized version of the resource from the optimized version of the resource, and returns the non-optimized version of the resource to the script; and
wherein the invoked resource optimization handler determines that the optimized version of the resource is available by performing a lookup on a table using an identifier associated with the resource, wherein the table maps identifiers associated with resources to identifiers associated with optimized resources, wherein the invoked resource optimization handler determines that the optimized version of the resource is available if the lookup succeeds, and wherein the invoked resource optimization handler determines that the optimized version of the resource is not available if the lookup fails.

2. The method of claim 1, wherein in response to determining that the resource is available in a local cache, the invoked resource optimization handler retrieves the resource from the local cache instead of retrieving the resource from the remote location.

3. The method of claim 2, wherein prior to the second script invoking the function, the resource was pre-fetched and stored by another resource optimization handler in the local cache.

4. The method of claim 1, wherein in response to determining that the resource is not available in a local cache, the invoked resource optimization handler retrieves the resource from the remote location.

5. The method of claim 1, wherein in response to determining that the resource is not available in a local cache, the invoked resource optimization handler invokes the function, which, in turn, retrieves the resource from the remote location.

6. The method of claim 1, wherein the optimized version of the resource is a de-duplicated version of the resource, and wherein the invoked resource optimization handler generates the non-optimized version of the resource by reconstructing the resource from the de-duplicated version of the resource.

7. The method of claim 1, wherein the optimized resource is a compressed version of the resource, and wherein the invoked resource optimization handler generates the non-optimized version of the resource by decompressing the optimized resource.

8. The method of claim 1, wherein the optimized resource is a concatenated version that was obtained by concatenating multiple resources, and wherein the invoked resource optimization handler generates the non-optimized version of the resource by de-concatenating the optimized resource.

9. The method of claim 1, wherein each identifier associated with a resource or an optimized resource is a Uniform Resource Locator (URL).

10. A non-transitory computer-readable storage medium storing software code that, when executed by a computer, causes the computer to perform a method, the method comprising:

sending a request to a server, wherein the software code includes a browser and a set of functions for obtaining and presenting information, and wherein the set of functions can be invoked by scripts that are retrieved by the browser;

in response to the request, receiving a first script and at least a second script from the server, wherein the first script includes instructions for adding a proxy software layer to intercept invocations to the set of functions, wherein the second script includes at least one invocation to at least one function in the set of functions, and wherein the first script and at least the second script are received by the browser;

executing the first script on the computer, thereby adding the proxy software layer to intercept subsequent invocations to each function in the set of functions;

executing the second script; and when the executing second script invokes a function in the set of functions, the proxy software layer intercepting said invocation of the function, and the proxy software layer invoking a resource optimization handler corresponding to the function instead of invoking the function, wherein the second script invoked the function to retrieve a resource from a remote location;

wherein in response to determining that an optimized version of the resource is available, the invoked resource optimization handler retrieves the optimized version of the resource, generates a non-optimized version of the resource from the optimized version of the resource, and returns the non-optimized version of the resource to the script; and wherein the invoked resource optimization handler determines that the optimized version of the resource is available by performing a lookup on a table using an identifier associated with the resource, wherein the table maps identifiers associated with resources to identifiers associated with optimized resources, wherein the invoked resource optimization handler determines that the optimized version of the resource is available if the lookup succeeds, and wherein the invoked resource optimization handler determines that the optimized version of the resource is not available if the lookup fails, wherein each identifier associated with a resource or an optimized resource is a Uniform Resource Locator (URL).

11. The non-transitory computer-readable storage medium of claim 10, wherein in response to determining that the resource is available in a local cache, the invoked resource optimization handler retrieves the resource from the local cache instead of retrieving the resource from a remote location; and wherein in response to determining that the resource is not available in a local cache, the invoked resource optimization handler retrieves the resource from the remote location.

12. An apparatus, comprising:
a processor; and
a non-transitory computer-readable storage medium storing software code that, when executed by the processor, causes the apparatus to perform a method, the method comprising:

sending a request to a server, wherein the software code includes a browser and a set of functions for obtaining and presenting information, and wherein the set of functions can be invoked by scripts that are retrieved by the browser;

in response to the request, receiving a first script and at least a second script from the server, wherein the first script includes instructions for adding a proxy software layer on the apparatus to intercept invocations to the set of functions, and wherein the second script includes at least one invocation to at least one function in the set of functions, and wherein the first script and at least the second script are received by the browser;

executing the first script, thereby adding the proxy software layer to intercept subsequent invocations to each function in the set of functions;

executing the second script; and when the executing second script invokes a function in the set of functions, the proxy software layer intercepting said invocation of the function, and the proxy software layer invoking a resource optimization handler corresponding to the function instead of invoking the function, wherein the second script invoked the function to retrieve a resource from a remote location;

wherein in response to determining that an optimized version of the resource is available, the invoked resource optimization handler retrieves the optimized version of the resource, generates a non-optimized version of the resource from the optimized version of the resource, and returns the non-optimized version of the resource to the script; and wherein the invoked resource optimization handler determines that the optimized version of the resource is available by performing a lookup on a table using an identifier associated with the resource, wherein the table maps identifiers associated with resources to identifiers associated with optimized resources, wherein the invoked resource optimization handler determines that the optimized version of the resource is available if the lookup succeeds, and wherein the invoked resource optimization handler determines that the optimized version of the resource is not available if the lookup fails.

13. The apparatus of claim 12, wherein in response to determining that the resource is available in a local cache, the invoked resource optimization handler retrieves the resource from the local cache instead of retrieving the resource from a remote location; and wherein in response to determining that the resource is not available in a local cache, the invoked resource optimization handler retrieves the resource from the remote location.

* * * * *

UNITED STATES PATENT AND TRADEMARK OFFICE
CERTIFICATE OF CORRECTION

| | |
|---|---|
| PATENT NO. | : 9,825,812 B2 |
| APPLICATION NO. | : 14/327187 |
| DATED | : November 21, 2017 |
| INVENTOR(S) | : Glenn C. Conner et al. |

Page 1 of 1

It is certified that error appears in the above-identified patent and that said Letters Patent is hereby corrected as shown below:

In the Claims

In Claim 01 (at Column 12, Line 14), please replace the word "script" with the words --second script--.

In Claim 10 (at Column 13, Line 33), please replace the word "script" with the words --second script--.

In Claim 12 (at Column 14, Line 37), please replace the word "script" with the words --second script--.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*